United States Patent
Mann

(10) Patent No.: US 6,560,698 B1
(45) Date of Patent: May 6, 2003

(54) REGISTER CHANGE SUMMARY RESOURCE

(75) Inventor: Daniel P. Mann, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/306,879

(22) Filed: May 7, 1999

(51) Int. Cl.⁷ .................................................. G06F 9/44
(52) U.S. Cl. ........................ 712/248; 712/5; 712/224; 712/229; 712/247
(58) Field of Search ........................ 709/102; 712/227, 712/248, 5, 224–229, 247; 713/323, 300; 710/260, 62; 716/10; 717/4; 714/45, 46

(56) References Cited

U.S. PATENT DOCUMENTS

| | | | |
|---|---|---|---|
| 5,684,997 A | * 11/1997 | Kau et al. | 710/260 |
| 5,727,221 A | * 3/1998 | Walsh et al. | 713/310 |
| 5,784,291 A | * 7/1998 | Chen et al. | 716/10 |
| 5,867,717 A | * 2/1999 | Milhaupt et al. | 713/323 |
| 6,192,463 B1 | * 2/2001 | Mitra et al. | 712/43 |
| 6,363,442 B1 | * 3/2002 | Hunter et al. | 710/62 |

OTHER PUBLICATIONS

*Intel Architecture Software Developer's Manual, vol. 3: System Programming Guide*, Appendix A–Performance Monitoring Events, Intel Corp. (1997) 23 pages.

*Intel Performance Evaluation & Analysis Kit—1394 Toolkit*, Intel Corp., 2 pages, http://developer.intel.com/design/ipeak/1394.

*Intel Performance Evaluation & Analysis Kit—ID Monitor: A WDM IO Monitoring Tool*, Intel Corp., 2 pages, http://developer.intel.com/design/ipeak/iomon.

* cited by examiner

*Primary Examiner*—Anil Khatri
*Assistant Examiner*—Chuck Kendall
(74) *Attorney, Agent, or Firm*—Akin Gump Strauss Hauer & Feld LLP

(57) ABSTRACT

A microcontroller provides a register change summary resource for summarizing register changes. Selected system registers within each resource are coupled to bits in resource change registers of the register change summary resource using logic that tracks accesses to the system registers. Each resource change register is coupled to a bit in a summary register. For systems with numerous system registers, each summary register may be coupled to a bit in a higher-level summary register. The register change summary resource further provides a software-controlled bit mask register. A change in a summary or resource change register may trigger a processor interrupt. Each register in the register change summary resource can be reset, also under software control. The registers within the register change summary resource are accessible through a dedicated software development port.

25 Claims, 4 Drawing Sheets

REGISTER CHANGE SUMMARY RESOURCE

BACKGROUND OF THE INVENTION

1. Field of the Invention

The invention relates to microcontrollers having registers associated with different resources contained therein and, more particularly, to a method for efficiently determining changes in registers in such systems.

2. Description of the Related Art

As microcontrollers become more and more complex, the number of resources that make up the microcontroller has grown. The increase in system resources, coupled with increasing processor clock speeds, has placed new burdens on system developers and complicated the task of debugging new systems. For each new resource contained within a microcontroller or other processor-oriented system, numerous resource registers may be maintained.

Many system resources require management of a large number of registers. For example, typical systems that support direct memory access, or DMA, can maintain many DMA registers. DMA command registers, DMA mode registers, DMA request registers, DMA mask registers, DMA address registers, and DMA page registers are usually included in a microcontroller.

Different resources within a microcontroller are often developed and maintained by different design teams, often not even within the same company. This decentralization of design teams has not been well-suited to debugging of system resources. The need to provide support for developing and debugging a system is particularly acute within the embedded products industry, where specialized on-chip circuitry is often combined with a processor core.

System resources are typically debugged by reading all the registers of the resource after the microcontroller has stopped. The registers are then compared to a previously saved value in order to identify which registers have changed. Comparing each register in this serial fashion can be slow.

SUMMARY OF THE INVENTION

A microcontroller according to the present invention includes a register change summary resource. The register change summary resource is a register or group of registers that indicates whether other registers in the microcontroller have changed. The register change summary resource enables system programmers and debuggers to quickly obtain a summary of register changes throughout the system. The register change summary resource enables debugging to take place in an iterative manner, starting from a system level and working down to the resource level as necessary. The register change summary resource eliminates the need to scan all registers of a system to determine if any of their contents has changed. Thus, the register change summary resource is an efficient debugging and development tool.

In one embodiment, the register change summary resource employs a set of resource change registers and summary registers. A resource change register reflects writes to a system register. Thus, each system resource register is coupled to a bit of a resource change register. Alternatively, multiple registers can tie to a unique bit in the resource change register. Further, the resource change register bits can be responsive to other accesses to the monitored system resource registers, to writes that change the register, to writes that do not change the register, to reads of the register, or any combination of these accesses.

A summary register reflects changes to a resource change register. So, each resource change register is coupled to a bit in a summary register. For systems with multiple summary registers, the summary registers may also be coupled to bits in higher level summary registers. Subsequent levels of summary registers thus may be provided for systems with large numbers of registers to be monitored.

The register change summary resource further may contain one or more bit mask registers. This register allows changes in certain resource change or summary registers to trigger an interrupt. After the interrupt is polled by a processor of the microcontroller, the system debugger is informed by the bit mask register of which resource change register or summary register caused the interrupt.

The register change summary resource includes reset logic that enables a user to reset the resource change registers and the summary registers. Once the resource change registers are reset, they reflect the current state of their associated system registers. In this way, a user may initialize the register change summary resource for a new debug session after a register change analysis is complete.

The register change summary resource may also contain logic such that, once resource change or summary register changes, the associated bit in the resource change register or summary register is latched to a predetermined value. This ensures that, once a resource change register or summary register changes, the change is reflected in the register change summary resource and is only cleared upon reset by the user.

The register change summary resource may also include a software development port. This port permits dedicated access to the register change summary resource during debug of the system.

A register change summary resource permits a developer or debugger to systematically identify a system problem. The developer or debugger starts with a high-level overview of register changes that occurred. Then, systematically and iteratively, the developer or debugger applies closer scrutiny to the problem resource or register. Using this process, identification and scrutiny of certain registers in the system might be avoided.

BRIEF DESCRIPTION OF THE DRAWINGS

A better understanding of the present invention can be obtained when the following detailed description of the preferred embodiment is considered in conjunction with the following drawings, in which:

FIG. 4 is an illustration of how the bit mask register of FIG. 2a operates in conjunction with the exemplary registers in the register change summary resource of FIGS. 1 and 2a.

DETAILED DESCRIPTION OF THE PREFERRED EMBODIMENT

Figure 1:
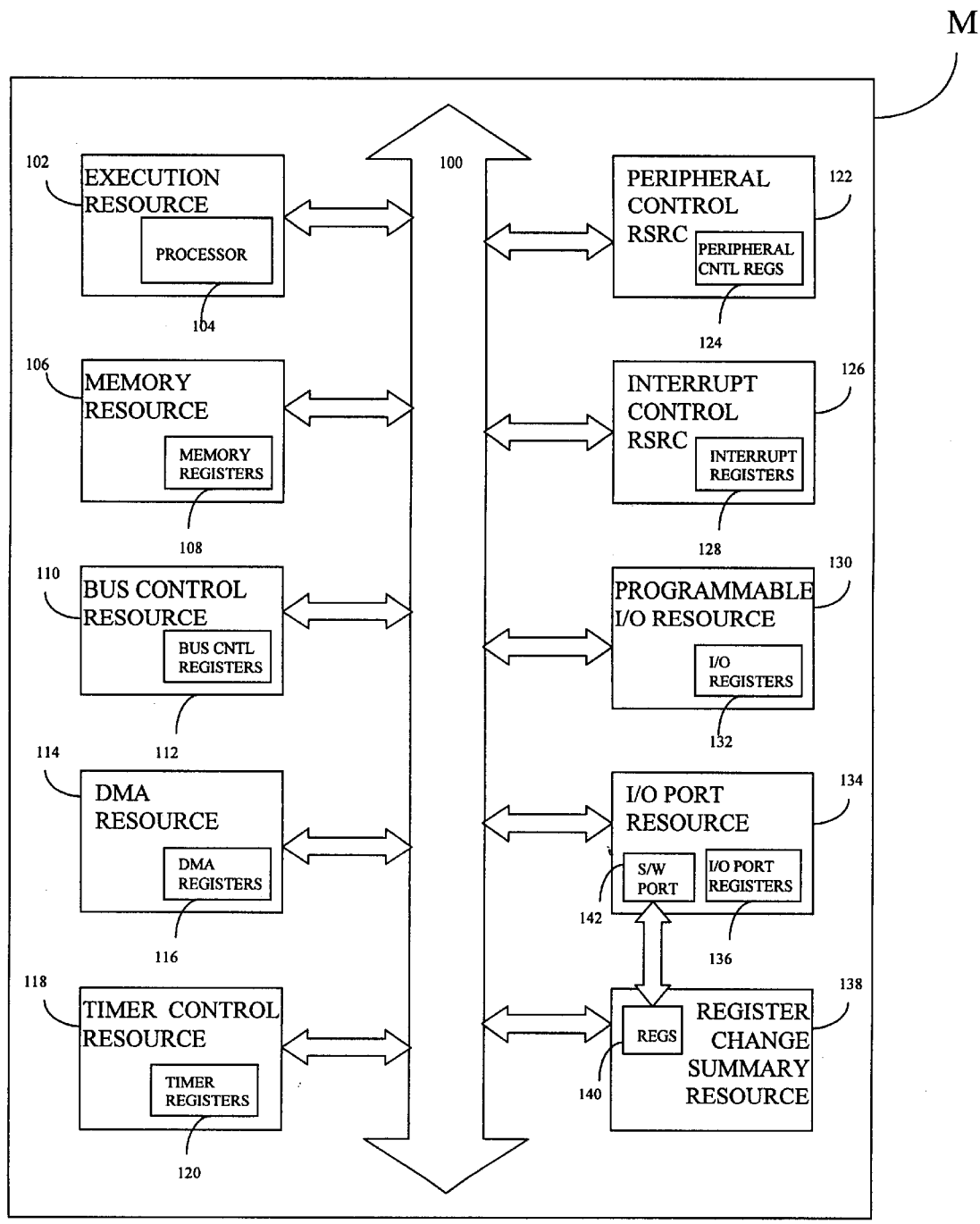
FIG. 1 is a block diagram of an exemplary processor-oriented system incorporating a register change summary resource in accordance with the present invention.

Turning now to the drawings, FIG. 1 shows a block diagram of an exemplary architecture for a microcontroller M in accordance with the present invention. The microcontroller M is comprised of a number of resources, each shown as a separate unit.

A variety of configurations and combinations of these resources of the microcontroller M are possible. The microcontroller M, for example, could be the Am186™ ED microcontroller, the Elan™ SC400 microcontroller, or the Am186™ CC microcontroller.

The techniques and circuitry according to the invention could be applied to a wide variety of microcontrollers. The term "microcontroller" itself has different definitions in the industry. Some companies refer to a processor core with additional features (such as I/O) as "microprocessor" if it has no on-board memory, and digital signal processors (DSPs) are now used for both special and general purpose controller functions. As here used, the term "microcontroller" covers all of the products, and generally means an execution resource with added functionality all implemented on a single monolithic integrated circuit.

The microcontroller M may support a variety of on-chip resources. The illustrated architecture includes an execution resource 102, a memory resource 106, a bus control resource 110, a direct memory access (DMA) resource 114, a timer control resource 118, a peripheral control resource 122, an interrupt control resource 126, a programmable I/O resource 130, an I/O port resource 134, and a register change summary resource 138. Each resource is coupled to a system bus 100. The system bus 100 may include a data bus, an address bus, and a control bus for communicating data, addresses and control information between any of these coupled resources.

The execution resource 102 may provide a highly integrated processor 104 for executing code stored by the memory resource 106. The execution resource 102 in the disclosed embodiment is compatible with the Am186 instruction set implemented in a variety of microcontrollers from Advanced Micro Devices, Inc. of Sunnyvale, Calif. A variety of other execution resources could be used instead of the execution resource 102.

The memory resource 106 may support multiple memory controllers for controlling communication of data to and from off-chip memory devices. These memory devices for example may include dynamic random access memory (DRAM), read only memory (ROM), and/or flash memory. An example of a memory controller is a DRAM controller providing extended data out (EDO) and/or synchronous DRAM (SDRAM) support, write buffering support, and read-ahead buffering support. A plurality of memory registers 108 is shown within the memory resource 106.

The bus control resource 110 may provide a host of bus controllers for controlling a variety of buses and supporting the peripherals connected to those buses. These bus controllers for example may include a USB (Universal Serial Bus) controller, an ISA (Industry Standard Architecture) bus controller, a PCI (Peripheral Component Interconnect) bus controller, a General Purpose Bus controller, and/or a VL-Bus controller. By programming the bus control registers 112, the bus control resource 110 permits the microcontroller M to support a number of external buses and peripherals.

The DMA resource 114 may provide multiple DMA controllers for controlling direct memory access transfers between the resources of the microcontroller M. Each DMA controller may have several DMA channels which are part of the DMA registers 116. The timer control resource 118 provides timer registers 120 that, for example, may be programmed as counters by system software.

The peripheral control resource 122 may provide a host of integrated peripheral controllers for controlling a variety of peripheral devices. These peripheral controllers, for example, may include a graphics controller, a keyboard controller, and/or a PC Card controller. The graphics controller preferably provides an internal unified memory architecture (UMA) and software compatibility with a variety of graphic adapters. The PC Card controller or adapter preferably conforms to PCMCIA (Personal Computer Memory Card International Association) standards. The peripheral control registers 124 are provided for flexible programming of peripheral devices.

The interrupt control resource 126 may provide multiple interrupt controllers for supporting several interrupt requests. Using the interrupt control registers 128, each interrupt controller may regulate issuance and acceptance of its associated interrupt requests. The programmable I/O resource 130 supports several general-purpose I/O pins and I/O registers 132. These pins provide a parallel interface for external devices to the microcontroller M.

Using I/O port registers 136, the I/O port resource 134 may provide a standard parallel port interface, serial port interface, and/or infrared port interface. The parallel port interface may support an enhanced parallel port (EPP) mode for high-speed transfers. The serial port interface and infrared interface may be driven by an industry-standard universal asynchronous receiver/transmitter (UART) so as to permit PC compatibility.

The register change summary resource 138 of the present invention provides dedicated registers 140 for quickly determining changes to registers in other system resources. The register change summary resource 138 may be accessed via the software development port 142, shown as part of the I/O port resource 134. The software development port 142 is a dedicated port for accessing a variety of debug-related items, including registers of the register change summary resource 138. The registers 140 may include resource change registers, summary registers, bit mask registers and reset registers (not shown). The registers 140 of the register change summary resource 138 and the software development port 142 are described in more detail below.

It should be understood that the disclosed resources are illustrative and not exhaustive. A number of the illustrated resources could be eliminated, or added to, without detracting from the spirit of the invention. Further, selection of the particular resources supported by the microcontroller M may be a function of the particular microcontroller application. As an example, for a mobile computing application, an infrared port interface, graphics controller, and PC Card controller may be supported. As another example, for a communications application, a USB controller and an HLDC (High-Level Data Link Control) controller may be supported. The disclosed microcontroller M thus provides architectural flexibility.

As FIG. 1 shows, many of the resources coupled to the system bus 100 include registers. Access to the register set of each system resource may be unique. Further, for each system resource, its registers are potentially monitored or programmed by a variety of developers. These developers may include hardware developers, who, at a minimum, the resource to some operating state, ROM developers, who program the resource to some initial state during power-up, application programmers, whose programs utilize the resource, and driver developers, who provide an interface to the application programmers, to name a few. Due to the large number of potential developers and the large number of system resources, management and debug of the registers in a microcontroller can be cumbersome. The registers for the various system resources generally are referred herein as system resource registers.

Throughout this disclosure, any terms "set", "assert", "active", and the like refer to driving a signal to its true state. Any terms "deassert", "not asserted", "inactive" and the like refer to a signal which is not driven to its true state.

Figure 2A:
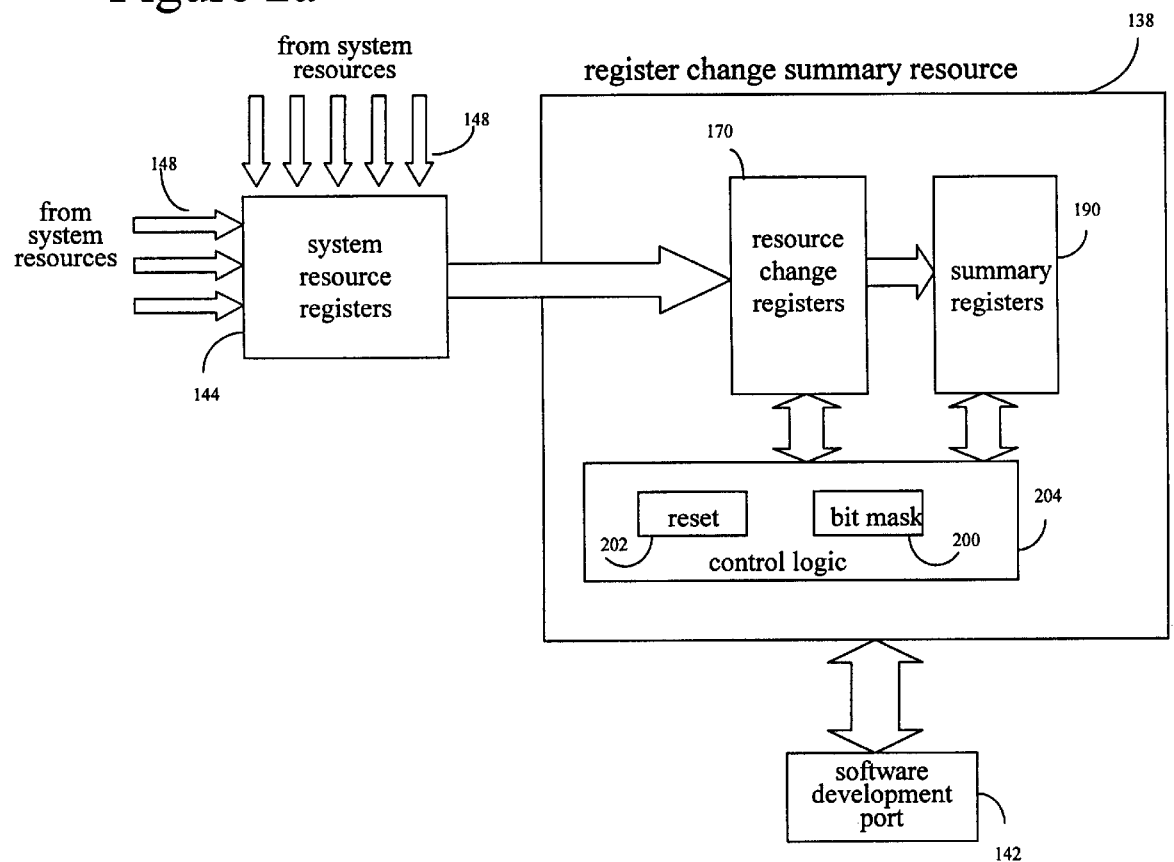
FIG. 2a is a block diagram of the components of an embodiment of the register change summary resource of FIG. 1 according to the present invention.

FIG. 2a is a block diagram of an exemplary register change summary resource 138 according to the present invention. The register change summary resource 138 receives selected system resource registers 144 from various system resources. The system resource registers 144 are shown by arrows 148 as coming from eight system resources. The register change summary resource 138, however, can monitor system resource registers 144 for any number of system resources.

The system resource registers 144 are shown coupled to resource change registers 170 of the register change summary resource 138. The resource change registers 170 identify accesses to selected system resource registers 144. A single resource change register 170 may be coupled to a single system resource register 144. However, ideally, each resource change registers 170 provides information about a number of system resource registers 144. Thus, coupling a bit of a resource change register 170 to an entire system resource register 144 provides change information about a number of system resource registers 144 as a result of a single read of a resource change register 170.

Figure 2B:
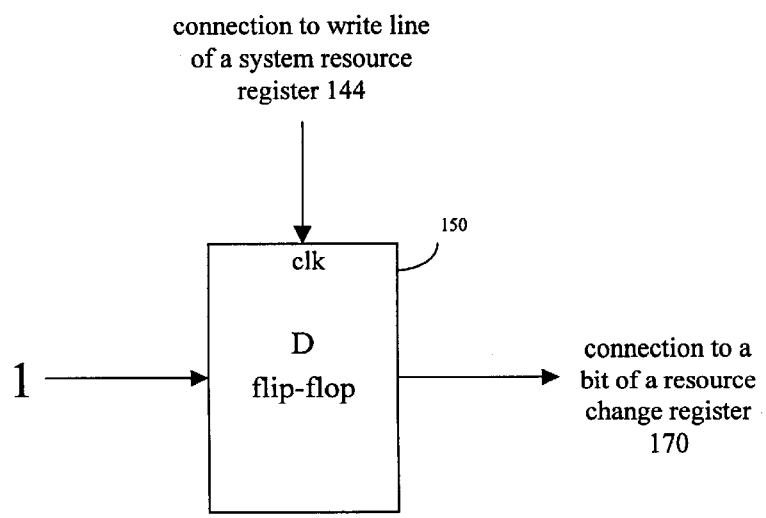
FIG. 2b is an illustration of the relationship between system resource registers and resource change registers, according to one embodiment of the present invention.

FIG. 2b shows one embodiment coupling the system resource registers 144 to the resource change registers 170. Using a D flip-flop 150, the clock line is connected to the write line of a system resource register 144. The output of the D flip-flop 150 is connected to a single bit of a resource change register 170. The input to the D flip-flop is a "1." If any bit of the system resource register 144 is written to, the clock line will go high, feeding into the D flip-flop 150. This causes the "1" input to latch to the output, setting the bit in the resource change register 170. Thus, a write to any bit of the system resource register 144 results in a bit set in a corresponding resource change register 170. System designers of ordinary skill in the art recognize several ways that changes to system resource registers 144 may be coupled to resource change registers 144.

The resource change logic may be grouped in any manner by the system designer. However, preferably, the resource change registers 170 are grouped by system resource. This will simplify the debug process, as the system debugger is likely to approach a debug problem from a system resource perspective.

The bits of the resource change registers 170 identify which one of the system resource registers 144, if any, has been written between two points in time. Likewise, the resource change registers 170 are coupled to summary registers 190. The bits of the summary registers 190 identify which one of the resource change registers 170, if any, has been written. These registers will be discussed in greater detail below in connection with FIG. 3.

Although only one set of summary registers 190 is shown, additional levels of summary registers may be included in the register change summary resource 138. Each additional level may serve as summaries of the level adjacent to it. Thus, bits of higher level summary registers, for example, may be identified with adjacent lower level summary registers, in like structure and operation as the resource change registers 170 that have herein been described. Systems with large numbers of registers may find such additional logic helpful.

Also coupled to the resource change registers 170 and the summary registers 190 is control logic 204. The control logic 204 includes a reset register 202 and a bit mask register 200, each of which permit the system debugger to configure and control the register change summary resource 138. The reset register 202 may be coupled to any or all of the resource change registers 170 and the summary registers 190. The reset register 202 may be configured to reset all registers at once or a certain set of registers in the register change summary resource 138 by writing a predetermined value to the reset register 202. System designers skilled in the art will recognize a number of ways that a reset function can be invoked.

The bit mask register 200 enables a change in one of the resource change registers 170 or summary registers 190 of the register change summary resource 138 to generate processor interrupts. The bit mask register 200 thus may be coupled to the resource change registers 170 and/or the summary registers 190. Although a single bit mask register 200 is shown, a plurality of bit mask registers may be provided in the register change summary resource 138a.

Suppose a bit mask register 200, for example, is coupled to eight summary registers 190 such that each summary register 190 is identified with a single bit of an eight-bit size bit mask register 200. Under software control, the bit mask register 200 may be programmed so that whenever the specified summary register or registers 190 changes, a processor interrupt results. A more thorough discussion of the bit mask register 200 follows, in conjunction with the description of FIG. 4.

The register change summary resource 138 may be accessed via the software development port 142. The software development port 142 is a dedicated port for accessing all registers of the register change summary resource 138.

Figure 3:
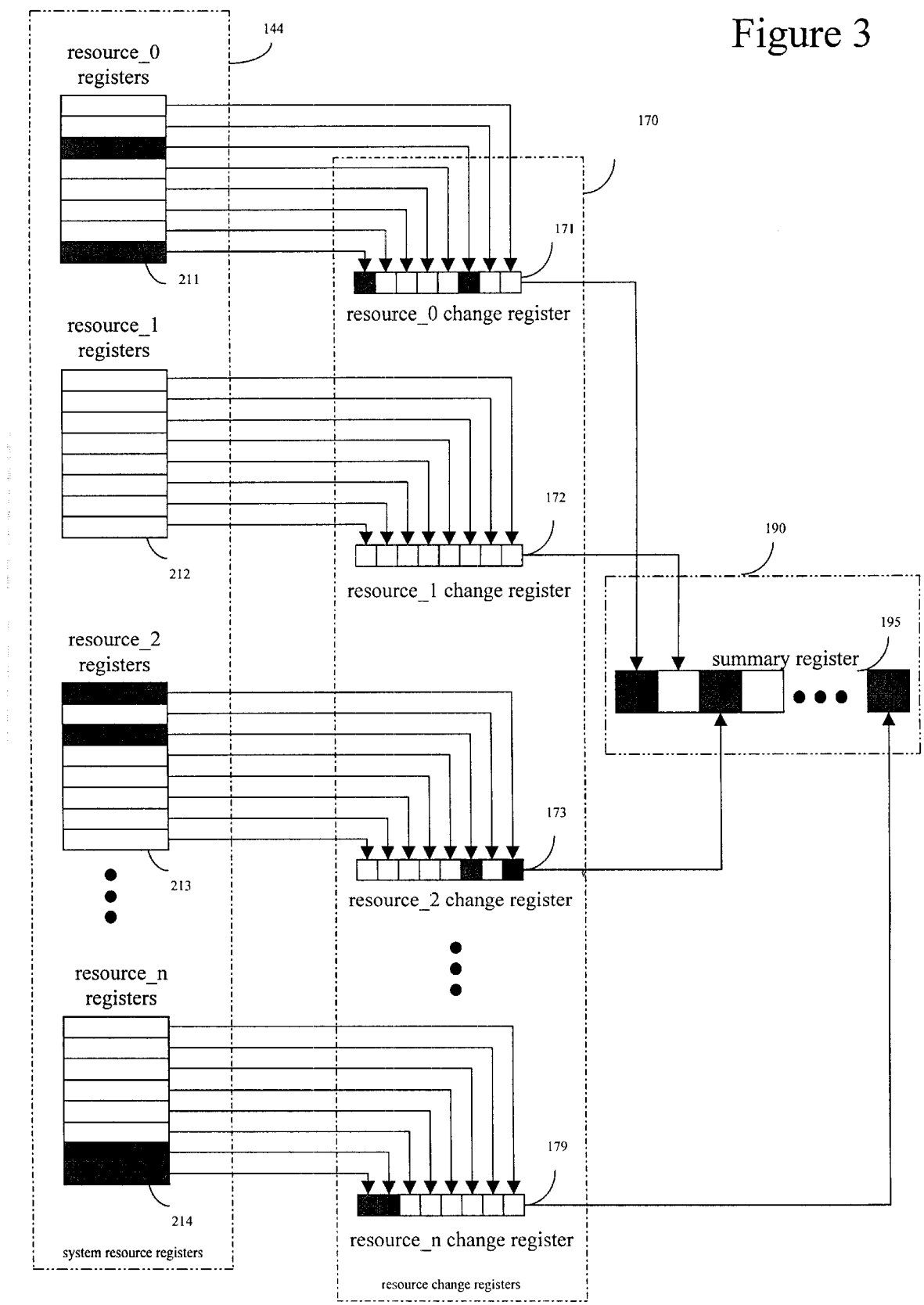
FIG. 3 is an illustration of the exemplary registers contained in the register change summary resource of FIGS. 1 and 2a according to the present invention.

FIG. 3 is a block diagram of the various exemplary registers within the register change summary resource 138 according to the invention. The figure illustrates resource change registers 170 and summary registers 190 for n+1 resources, starting with resource_0.

For each resource, a block of eight system resource registers is shown. These blocks show which registers have been written. White blocks represent untouched, or unwritten, registers, while gray blocks represent written registers. If any bit of a system resource register is written, the entire register is shown as a gray block.

The resource_0 register writes 211 are shown, coupled to bits of a resource_0 change register 171. Each register 211 is coupled to a unique bit of resource_0 change register 171. When a change to any of the system resource registers 144 for resource_0 occurs, the bit in resource_0 change register 171 is set. The bit of resource_0 change register 171 corresponding to a changed register 171, therefore, is also shown as a gray block.

Each resource change register 171, 172, 173, and 179 gives the system debugger a quick view of any changes to the system resource registers 144, eliminating the need to read the full contents of the system resource registers 144 to determine a change in one of them. Persons familiar with computer system design recognize that alternative ways to configure the resource change registers 170 are possible.

Each resource change register 171, 172, 173, and 179 is coupled to a bit of a summary register 195. Like the resource change registers 171, 172, 173, and 179, the summary register 195 offers a more efficient way to view resource changes. Rather than read each resource change register 170, the system debugger may read the summary register 195 to identify which system resource changed.

FIG. 3 shows a single summary register 195. However, summary registers 190 can include additional summary registers (not shown), as needed. As noted, the need for additional summary registers 195 is dependent upon the number of resources in the system M as well as the number of system resource registers being monitored. Further, if the register change summary resource 138 contains multiple summary registers 195, they in turn may be coupled to bits of another set of summary registers (not shown). These additional summary registers summarize any changes to the summary registers 195 themselves.

Figure 4:
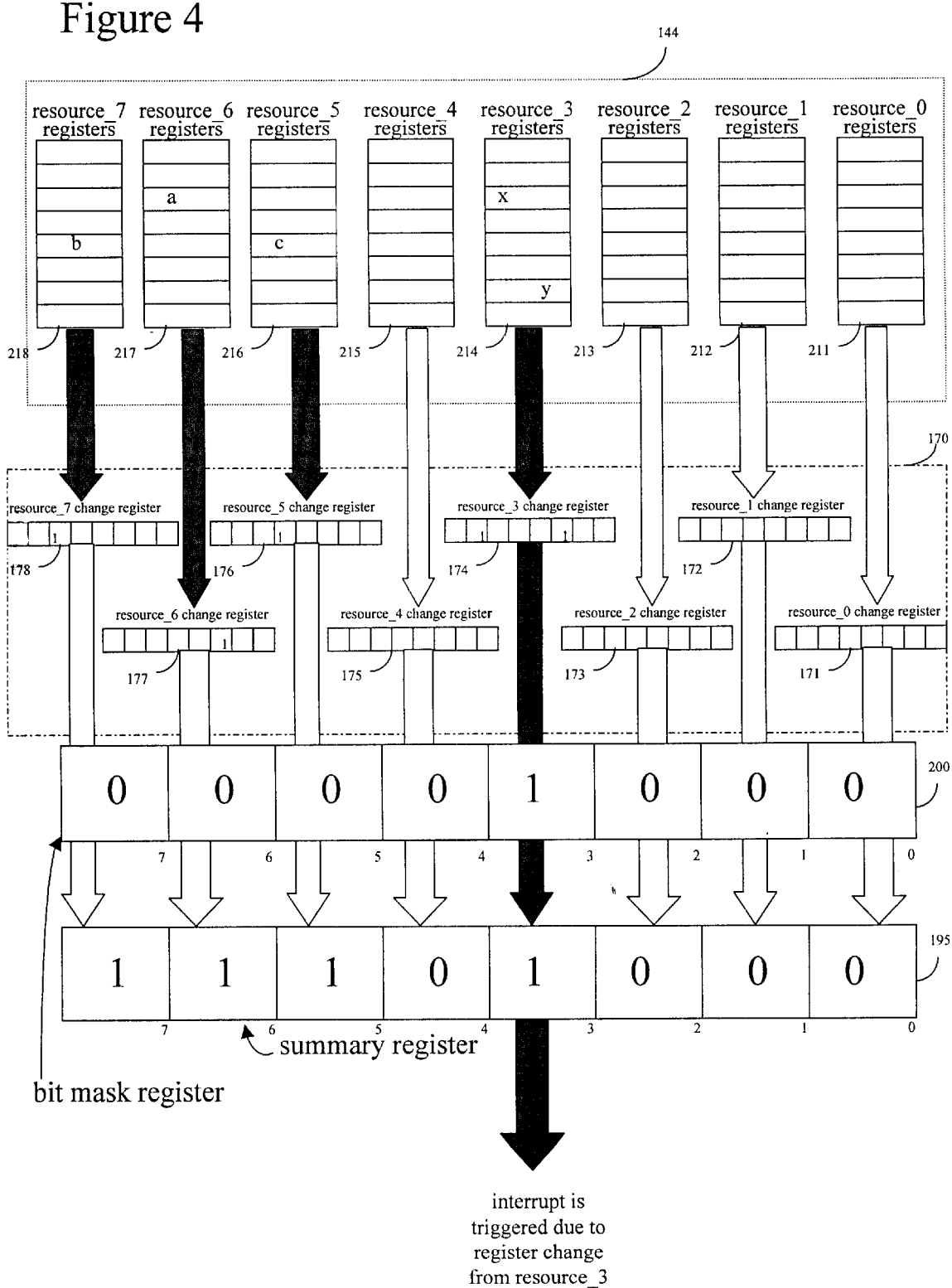

FIG. 4 is a block diagram illustrating how the bit mask register 200 may be used to trigger a processor interrupt. Eight system resources with each resource having eight system resource registers are considered in the illustration, although more resources and registers may be supported.

At the top of FIG. 4, resource_0 registers 211, resource_1 registers 212, . . . resource_7 registers 218 are shown. The system resource registers 144 are coupled to a resource change register 171–178. As shown and described in connection with FIG. 3, a write to one of the system resource registers 144 causes a corresponding bit in one of the resource change registers 170 to be set.

The eight resource change registers 171–178 are each coupled to a different bit in the summary register 195. Thus, a change to one of the resource change registers 171–178 sets a corresponding bit in the summary register 195. As noted above, reading the summary register 195 allows a system debugger to quickly identify in which of the eight resources a register change occurred. The system debugger then knows which resource change register 171–178 to read, for further examination of register changes within that resource.

The bit mask register 200 is an additional tool for the system debugger. In FIG. 4, bit 3 of the bit mask register 200 is set and bit 3 of the summary register 195 is set. Bit 3 is associated with resource_3. Two bits are set in the resource_3 change register 174. One bit is associated with a change in a system register 144 of resource_3 (identified by an "x" in results 214); the other bit is associated with a change in a system register 144 of resource_3 (identified by a "y" in results 214).

By setting bit 3 of bit mask register 200, which is associated with resource_3, either one of these changes, "x" or "y," triggers a processor interrupt. In this embodiment, setting the bit (to a "1") in the bit mask register 200 causes the processor interrupt to be triggered. However, those skilled in the art will recognize that the bit mask register 200 can also be cleared (to a "0") to trigger an interrupt.

As noted, the bit mask register 200 is software programmable. This provides the system debugger with a simple and accessible method for debugging different resources of the system M simply by setting a bit. Responsive to the processor interrupt triggered, the processor 104 polls the particular processor interrupt. The system debugger then reads the resource_3 change register 174 to identify more closely which system register 214 in resource_3 has changed.

Notice that resource_7 registers 218, resource_6 registers 217, and resource_5 registers 216 also include changed system registers, as noted by reference letters "b", "a", and "c," respectively. Further, resource_7 change register 178, resource_6 change register 177, and resource_5 change register 176 are each shown with a set bit. Note, however, that, although the summary register 195 contains a "1" in bits 7, 6, and 5, corresponding to resource_7 resource_6, and resource_5, a processor interrupt is not triggered by these changes to the summary register 195. The bit mask register 200 contains a "0" in each of the bits corresponding to resource_7, resource_6, and resource_5. Thus, no processor interrupt is triggered for the register changes identified by "b," "a," and "c," while a processor interrupt is triggered for register changes identified either by "x" or "y."

Although FIG. 4 shows the bit mask register 200 coupled to the summary register 195, the bit mask register 200 can instead be coupled to one of the resource change registers 171–178. Or, additional bit mask registers 200 can be provided, some coupled to summary registers 195 and others coupled to resource change registers 171–178. This allows the system debugger to focus upon a single resource of the microcontroller M when necessary.

Thus, the register change summary resource of the present invention provides an efficient tool for debugging a plurality of resources in a microcontroller. The register change summary resource permits the debugger to systematically identify and specify problems in the system. By first identifying register changes that occur to a resource, the system debugger can then more readily isolate debug problems. Using a bit mask register, a processor interrupt can be triggered when certain registers are modified. A software development port facilitates access to the register change summary resource. It should be understood that a variety of gating circuitry and compare circuitry may be utilized between units of the register change summary resource.

While the disclosed embodiments present certain techniques with which register changes are indicated, a variety of other techniques could be implemented within the spirit of the invention. For example, the summary registers could be accessed over the software development port 142, but could also be accessed by the processor 104 over the bus 100, for example. The summary registers could also be made accessible from a JTAG scan path. The software development port 142 can be controlled by JTAG commands, and such ports typically have direct access (or access via microcode) to all processor registers and resources. Also, a single system register could be coupled to multiple summary bits, or multiple system registers could be coupled to a single summary bit. A variety of other techniques can similarly be employed.

The foregoing disclosure and description of the invention are illustrative and explanatory thereof. Various changes in the components, circuit elements, masking techniques, signals, and registers, as well as in the details of the illustrated circuitry and construction and method of operation may be made without departing from the spirit of the invention.

I claim:

1. A microcontroller adapted for summarizing changes to a plurality of system registers, comprising:

a system bus;

a processor coupled to the system bus;

a plurality of resources coupled to the system bus, wherein each resource of the plurality of resources includes a plurality of system registers; and a register change summary resource coupled to a plurality of resources, comprising:

at least one resource change register coupled to the plurality of system registers, the resource change register including a plurality of bits, each of which transitions to a predetermined state when a corresponding system register is accessed.

2. The microcontroller of claim 1, wherein the access is a register read or write of the corresponding system register.

3. The microcontroller of claim 1, wherein the access is a register write of the corresponding system register.

4. The microcontroller of claim 1, wherein the access is an alteration of the corresponding system register.

5. The microcontroller of claim 1, wherein a one-to-one correspondence exists between the system registers and the resource change bits.

6. The microcontroller of claim 1, the register change summary resource further comprising:
latch logic for maintaining the states of register bits within the register change summary resource.

7. The microcontroller of claim 1, the register change summary resource further comprising:
reset logic for resetting register bits within the register change summary resource.

8. The microcontroller of claim 7, wherein the reset logic is programmed via a software development port of the microcontroller.

9. The microcontroller of claim 1, wherein a change in a system register causes a bit in the corresponding resource change register to be set.

10. The microcontroller of claim 1, the register change summary resource further comprising:
a plurality of bit mask registers, each bit in a bit mask register of the plurality of bit mask registers being coupled to a resource change register of the plurality of resource change registers.

11. The microcontroller of claim 10, wherein a bit in the bit mask register being set coupled with a change to the corresponding resource change register causes the processor to interrupt operation.

12. The microcontroller of claim 1, further comprising:
a software development port allowing each register in the register change summary resource to be accessible by an external system.

13. The microcontroller of claim 1, the register change summary resource further comprising:
a plurality of summary registers coupled to the plurality of resource change registers, each bit of a summary register of the plurality of summary registers being coupled to a resource change register of the plurality of resource change registers.

14. The microcontroller of claim 13, wherein a change in a resource change register causes a bit in the corresponding summary register to be set.

15. The microcontroller of claim 13, the register change summary resource further comprising:
a plurality of secondary summary registers coupled to the plurality of summary registers, each bit of a secondary summary register of the plurality of secondary summary registers being coupled to a summary register of the plurality of summary registers.

16. The microcontroller of claim 15, wherein a change in a summary register causes a bit in the corresponding secondary summary register to be set.

17. The microcontroller of claim 15, the register change summary resource further comprising:
a plurality of levels of summary registers, each level of summary registers being coupled to an adjacent level of summary registers, each bit of a higher level summary register being coupled to a register of an adjacent lower level summary register.

18. The microcontroller of claim 13, the register change summary resource further comprising:
a plurality of bit mask registers, each bit in a bit mask register of the plurality of bit mask registers being coupled to a summary register of the plurality of summary registers.

19. The microcontroller of claim 18, wherein a bit in the bit mask register being set coupled with a change to the corresponding summary register causes the processor to interrupt operation.

20. A method for summarizing changes to a plurality of system registers in a microcontroller, the method comprising the steps of:
monitoring selected system registers;
determining when a system register changes; and
setting a predetermined bit of a resource change register to a predetermined value in response to the system register changing.

21. The method of claim 20, further comprising the steps of:
coupling resource change registers to bit mask registers for monitoring a selected bit of the resource change registers; and
triggering processor interrupts when both a selected bit in the bit mask register is set and a corresponding bit in the resource change register is set.

22. The method of claim 20, further comprising the steps of:
coupling resource change registers to bits of summary registers for summarizing bit changes to the resource change registers; and
reading summary registers.

23. The method of claim 22, further comprising the steps of:
coupling summary registers to bit mask registers for monitoring a selected bit of the summary register; and
triggering processor interrupts when both a bit in the bit mask register is set and a corresponding bit in the summary register is set.

24. A microcontroller adapted for summarizing changes to a plurality of system registers, comprising:
a system bus;
a processor coupled to the system bus;
a plurality of resources coupled to the system bus, wherein each resource of the plurality of resources includes a plurality of system registers; and
a register change summary resource, comprising:
means for tracking changes to the system registers.

25. The microcontroller of claim 24, the register change summary resource further comprising:
means for causing a predetermined change to a system register to trigger a processor interrupt.

* * * * *